US009473542B2

(12) United States Patent
Noldus

(10) Patent No.: US 9,473,542 B2
(45) Date of Patent: Oct. 18, 2016

(54) METHOD, SERVER AND USER EQUIPMENT FOR ACCESSING AN HTTP SERVER

(75) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 14/363,424

(22) PCT Filed: Dec. 9, 2011

(86) PCT No.: PCT/EP2011/072318
§ 371 (c)(1),
(2), (4) Date: Aug. 29, 2014

(87) PCT Pub. No.: WO2013/083200
PCT Pub. Date: Jun. 13, 2013

(65) Prior Publication Data
US 2014/0369261 A1    Dec. 18, 2014

(51) Int. Cl.
*H04L 29/06*        (2006.01)
*H04W 12/04*        (2009.01)
(Continued)

(52) U.S. Cl.
CPC ........... *H04L 65/1069* (2013.01); *H04L 63/08* (2013.01); *H04L 65/1006* (2013.01); *H04L 65/1016* (2013.01); *H04L 67/02* (2013.01); *H04W 12/04* (2013.01); *H04W 88/02* (2013.01)

(58) Field of Classification Search
CPC ... H04L 65/1016; H04L 67/02; H04L 63/08; H04L 65/1006; H04L 65/1069; H04W 12/04; H04W 88/02
USPC ......................................................... 370/328
See application file for complete search history.

(56) References Cited

U.S. PATENT DOCUMENTS

2006/0245403 A1*  11/2006  Kumar ................ H04L 12/2803
                                                            370/338
2009/0017796 A1    1/2009  Foti
2010/0199341 A1*   8/2010  Foti .................... H04L 63/0807
                                                             726/9

(Continued)

FOREIGN PATENT DOCUMENTS

WO          2009145554 A2       12/2009
WO      WO 2014169864 A1 *      10/2014   ......... H04L 65/1046

OTHER PUBLICATIONS

M. Mandi, O. Dugeon, R. Bars and B. Lamer, "New UPnP service for multimedia remote sharing with IMS framework, 2010," Intelligence in Next Generation Networks (ICIN), 2010 14th International Conference on, Berlin, pp. 1-6. http://ieeexplore.ieee.org/stamp/stamp.jsp?tp=&arnumber=5640937&isnumber=5640879.*

(Continued)

*Primary Examiner* — Melvin Marcelo
*Assistant Examiner* — Kenneth P Hunt
(74) *Attorney, Agent, or Firm* — Murphy, Bilak & Homiller, PLLC

(57) ABSTRACT

Method for accessing a Hypertext Transfer Protocol (HTTP) server from a user equipment. The method comprises the steps of transmitting, by the user equipment, an HTTP message destined for that HTTP server to an Internet Protocol Multimedia Subsystem (IMS) server with which the user equipment is in a connection, determining, by the IMS server, on the basis of the HTTP message whether a trust relation exists between the IMS server and the HTTP server, and if a trust relation exists transmitting the HTTP message from the IMS server to the HTTP server.

4 Claims, 3 Drawing Sheets

(51) Int. Cl.
*H04L 29/08* (2006.01)
*H04W 88/02* (2009.01)

(56) References Cited

U.S. PATENT DOCUMENTS

| | | | | |
|---|---|---|---|---|
| 2011/0138453 | A1* | 6/2011 | Verma | H04L 63/0815 |
| | | | | 726/8 |
| 2013/0159520 | A1* | 6/2013 | Engelhart | H04L 65/104 |
| | | | | 709/225 |
| 2014/0282990 | A1* | 9/2014 | Engelhart | H04L 63/08 |
| | | | | 726/9 |

OTHER PUBLICATIONS

M. Adeyeye, N. Ventura and L. Foschini, "CAS: A SIP-based proxy for the provisioning of HTTP session mobility, 2011," 2011 IEEE Consumer Communications and Networking Conference (CCNC), Las Vegas, NV, pp. 1011-1015. http://ieeexplore.ieee.org/stamp/stamp.jsp?tp=&arnumber=5766317&isnumber=5766312.*

3GPP, "3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 10)", 3GPP TS 26.237 V10.1.0, Mar. 2011, 1-137.

* cited by examiner

METHOD, SERVER AND USER EQUIPMENT FOR ACCESSING AN HTTP SERVER

TECHNICAL FIELD

The invention relates to a method, server and user equipment for accessing a Hypertext Transfer Protocol (HTTP) server from a user equipment, the user equipment preferably functioning within an Internet Protocol Multimedia Subsystem (IMS) network.

BACKGROUND

A user agent (UA) may be registered at an Internet Protocol Multimedia Subsystem (IMS) network. Access to the IMS network runs via an Internet Protocol (IP) access network. The IP access network is responsible for providing IP connectivity to the terminal, including IP address, access to Domain Name System (DNS) server etc. The registration to the IMS network may include authentication. The user is authorized to use the IMS services. A security association may exist between the user terminal and the IMS network (e.g. with the Proxy Call Session Control Function (P-CSCF) entity in the IMS network). If no security association is used, then Transport Layer Security (TLS) can be used between the user terminal and the IMS network. By virtue of said authentication in combination with Security association or TLS, all access to the IMS network is secure and trusted.

When a Security association is used for IMS access, then the IP address that the terminal uses for its IMS access may be provided by the P-CSCF entity. This IP address is then a local IP address from a P-CSCF point of view. The terminal uses this local IP address, which is tightly coupled to this Security association, for SIP registration and SIP session establishment. The Security association is carried over the IP access that is provided by the IP access network.

The terminal can also access other IP services than IMS. For example, the terminal may access a Hypertext Transfer Protocol (HTTP) server. The terminal uses the IP connectivity from the IP access network for accessing the HTTP server. The access to the HTTP server does not utilize a secure link comparable to the Security association that is established between the terminal and the IMS network. The access to the HTTP server is therefore not secure, from an HTTP server point of view.

The subscriber has two IP terminations. A first IP termination is from the IP access network (public IP termination). This first IP termination is used for IP services in general, such as HTTP and E-mail. This first IP termination is also used for non-secure access to the IMS network (e.g. before a security association is established). In addition, this first IP termination is used for IMS user plane media, such as Real-time Transport Protocol (RTP). This first IP termination may, in addition, be used to establish a Virtual Private Network (VPN) tunnel. A second IP termination is from the IMS network (IMS IP termination). This second IP termination is used for SIP signaling to/from the IMS network. This second IP termination constitutes a secure connection, based on IMS authentication.

SUMMARY OF THE INVENTION

Internet Protocol Multimedia Subsystem (IMS) offers secure Internet Protocol (IP) access. Authentication for IMS may, for example, be based on credentials stored in the IP Multimedia Services Identity Module (ISIM). This secure IP access is used for access to IMS based communication services. This secure connection is, however, used for IMS services only. Other services, such as Hypertext Transfer Protocol (HTTP) access, don't benefit from this secure connection.

According to the prior art, when a user accesses an HTTP server, the user will access that HTTP server through the IP termination from the IP access network. This IP termination is a non-secure access. Certain HTTP servers require authentication from the user before providing the requested information. This authentication is done by an HTTP POST transaction, initiated from the HTTP server to the HTTP client. The user is prompted to provide authentication parameters, such as user name and a password. An authentication algorithm is used between the HTTP client and the HTTP server to perform the authentication (challenge-response) in a secure manner, considering that a non-secure transport protocol may be used between the HTTP client and the HTTP server (Transmission Control Protocol (TCP)).

When the authentication is performed, the HTTP server sends the final response to the HTTP GET (200 Ok), containing the HTTP page. HTTP authentication is assumed to be understood by the informed reader and is therefore not further described.

Whereas the user authentication for accessing certain web pages is not problematic, it would be beneficial when the process of obtaining the requested HTTP information can benefit from the security enabled by the IMS secure connection. The user or terminal has already gone through rigorous authentication, resulting in the establishment of a secure connection with the IMS network.

It is an object of the present invention to obviate at least some of the above disadvantages and provide an improved method, server and user equipment for a secure connection with the HTTP server.

The invention provides an improved secure communication with the HTTP server without the need for additional authentication from the user. This has at least two advantages. First, there is no need for additional authentication by the user for HTTP access, and second HTTP access is more secure by the secure connection from IMS access, which is regarded as reliable.

Thereto, according to the invention is provided a method for accessing an HTTP server from a user equipment. The method comprises the step of transmitting, by the user equipment, an HTTP message, such as an HTTP Get request message, destined for that HTTP server to an IMS server with which the user equipment is in a secure connection. The secure connection results from the user equipment being authenticated by the IMS network, e.g. upon registration. The method further includes the step of determining, by the IMS server, on the basis of the HTTP message whether a trust relation exists between the IMS server and the HTTP server. The trust relationship is such that no authentication is required for communication between the IMS server and the HTTP server. The method further comprises, if such trust relation exists, transmitting the HTTP message from the IMS server to the HTTP server. Although the HTTP Get request message is specifically mentioned, the invention also applies to other HTTP messages such as an HTTP POST message.

Optionally, the method further comprises the steps of including, by the user equipment, the HTTP message, such as the HTTP Get request message, in a SIP Invite request message prior to transmitting the HTTP message to the IMS server. Herein the step of transmitting the HTTP message to the IMS server includes transmitting the SIP Invite request message comprising the HTTP message to the IMS server. The method then further includes retrieving, by the IMS server, the HTTP message from the SIP Invite request message. Also, other SIP messages than the mentioned SIP Invite request message may be used according to the invention.

Here it is noted that 3GPP TS 26.237 describes how a particular IP service request can be carried in a SIP Invite to a designated SIP application server (SIP-AS). That SIP-AS then constructs an HTTP Get message and dispatches that HTTP Get message to an HTTP server. For the method defined in 3GPP TS 26.237, the SIP Invite is specifically constructed by the terminal to contain a request for Multimedia Broadcast/Multicast Service (MBMS). The HTTP request is sent to a pre-configured Broadcast-Multicast-Service Centre. This methodology lacks flexibility for being used generically for HTTP servers. 3GPP TS 26.237 does not relate to a user equipment itself sending an HTTP Get message.

Optionally, the method includes the step of transferring content from the HTTP server to an HTTP client, such as an HTTP browser, in the user equipment and displaying the content, e.g. on a screen of the user equipment.

According to an aspect of the invention, instead of establishing the HTTP GET transaction via the public IP termination, the transaction is established via the IMS IP termination. The IMS IP termination supports SIP signaling between the terminal and the IMS network. In order to utilize the IMS IP termination for HTTP transactions, the HTTP request and response messages are carried in SIP request and response messages. In that manner, the transfer of HTTP signaling through the IMS security association is transparent for that security association.

A designated SIP application server (SIP-AS) in the IMS network shall retrieve the HTTP GET request message from the SIP request message and shall forward the HTTP GET request message to the HTTP server. The address of the HTTP server is contained on the Request Uniform Resource Identifier (R-URI) of the HTTP GET message, as normal.

A trust relation is in place between the IMS network operator and the HTTP server operator. Therefore, the HTTP server provides the requested information to the IMS server without requesting authentication. The rationale is that the IMS subscribers are already authenticated with the IMS network. The HTTP server operator can have a (commercial) agreement with the IMS operator that subscribers of that IMS operator have access to the information from the HTTP server without authentication from the HTTP server.

Optionally, a secure connection (Internet Protocol security (IPSec) or Transport Layer Security (TLS)) is established between the SIP-AS and the HTTP server. The HTTP server determines from the IP connection on which the HTTP GET arrives that no authentication is required.

Further HTTP signaling runs between the HTTP server and the HTTP client as per prior art. The SIP-AS shall carry the HTTP response messages on SIP response messages. When the HTTP GET transaction is complete, the SIP transaction, used to carry the GET request and response messages, is also complete.

Optionally, the method further comprises the steps of receiving by the IMS server, from the HTTP server, an HTTP response message transmitted in response to receiving, by the HTTP server, the HTTP message and transmitting, by the IMS server, the HTTP response message to the user equipment.

Optionally, the method further comprises the steps of including, by the IMS server, the HTTP response message received from the HTTP server in a SIP response message prior to transmitting the HTTP response message to the user equipment, wherein the step of transmitting the HTTP response message to the user equipment includes transmitting the SIP response message comprising the HTTP response message to the user equipment, and retrieving, by the user equipment, the HTTP response message from the SIP response message.

Optionally the IMS server is arranged for supporting native HTTP signaling, i.e. for communicating with an HTTP server using common HTTP messages.

Optionally, the user equipment includes a Multimedia telephony (MMTel) or WeShare/Rich Communication Suite (RCS) client and wherein the HTTP server is a further user equipment including an MMTel or WeShare/RCS client.

The invention also relates to an IMS server for a SIP-based communications network, arranged for establishing a secure connection with a UE. The secure connection results from the user equipment being authenticated by the IMS network, e.g. upon registration. The IMS server includes a first reception unit arranged for receiving, from the user equipment, an HTTP message, such as an HTTP Get request message, destined for an HTTP server, a determination unit arranged for determining, on the basis of the HTTP message (e.g. on the basis of the R-URI in the HTTP message), whether or not a trust relation exists between the IMS server and the HTTP server, and a first transmission unit arranged for, if the trust relation exists, transmitting the HTTP message to the HTTP server, a second reception unit arranged for receiving, from the HTTP server, an HTTP response message, a second transmission unit arranged for transmitting the HTTP response message to the user equipment. The IMS server also includes a controller communicatively connected to the first reception unit, the determination unit, the first transmission unit, the second reception unit, and the second transmission unit for controlling the first reception unit, the determination unit, the first transmission unit, the second reception unit, and the second transmission unit.

Optionally, the IMS server includes an inclusion unit arranged for including the HTTP response message in a SIP response message prior to transmitting the HTTP response message to the user equipment, wherein second transmission unit is arranged for transmitting the SIP response message including the HTTP response message to the user equipment. The first reception unit is arranged for receiving a SIP Invite request message including the HTTP message from the user equipment. The IMS server further comprises a retrieval unit arranged for retrieving the HTTP message from the SIP Invite request message.

Optionally, the IMS server comprising a support unit for supporting native HTTP signaling, i.e. the support unit is arranged for having the IMS server communicate with an HTTP server using common HTTP messages.

The invention also relates to User Equipment for use in a SIP-based communications network, the user equipment comprising an inclusion unit arranged for including an HTTP message, such as an HTTP Get request message, in a SIP Invite request message, a transmission unit arranged for transmitting the SIP Invite request message to a network node, such as an IMS server, a reception unit arranged for receiving a SIP response message including an HTTP response message from the network node, and a retrieval unit arranged for retrieving the HTTP response message from the SIP response message. The user equipment also includes a controller communicatively connected to the inclusion unit, the transmission unit, the reception unit, and the retrieval unit for controlling the inclusion unit, the transmission unit, the reception unit, and the retrieval unit.

BRIEF DESCRIPTION OF THE DRAWINGS

The invention will now be further elucidated by means of non-limiting examples referring to the drawings, in which.

DETAILED DESCRIPTION

Figure 1:
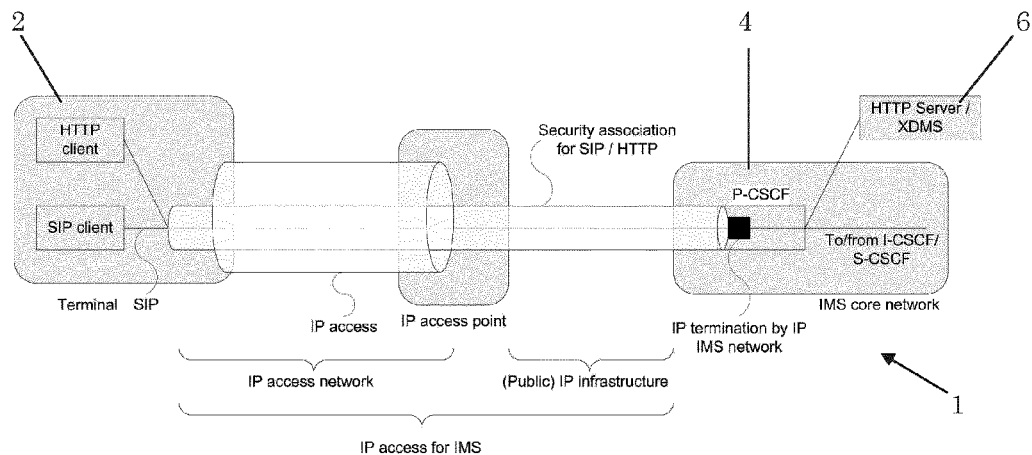
FIG. 1 is an embodiment of a system according to the invention.

FIG. 1 shows an example of a system 1 according to the invention. The system 1 forms an Internet Protocol Multimedia Subsystem (IMS) network. The system 1 comprises a User Equipment (UE) 2 and an IMS server 4. Here the IMS server 4 is a Proxy Call Session Control Function (P-CSCF) entity. The IMS network of the system 1 can also comprise a Session Initiation Protocol Application Server (SIP-AS). The system 1 also comprises a Hypertext Transfer Protocol (HTTP) server 6. The server 6 can also be an Extensible Markup Language (XML) Data Management Server (XDMS). XDMS acts as aggregation proxy for XML Configuration Access Protocol (XCAP) signaling, which is used for user self-control of IMS services.

Figure 2:
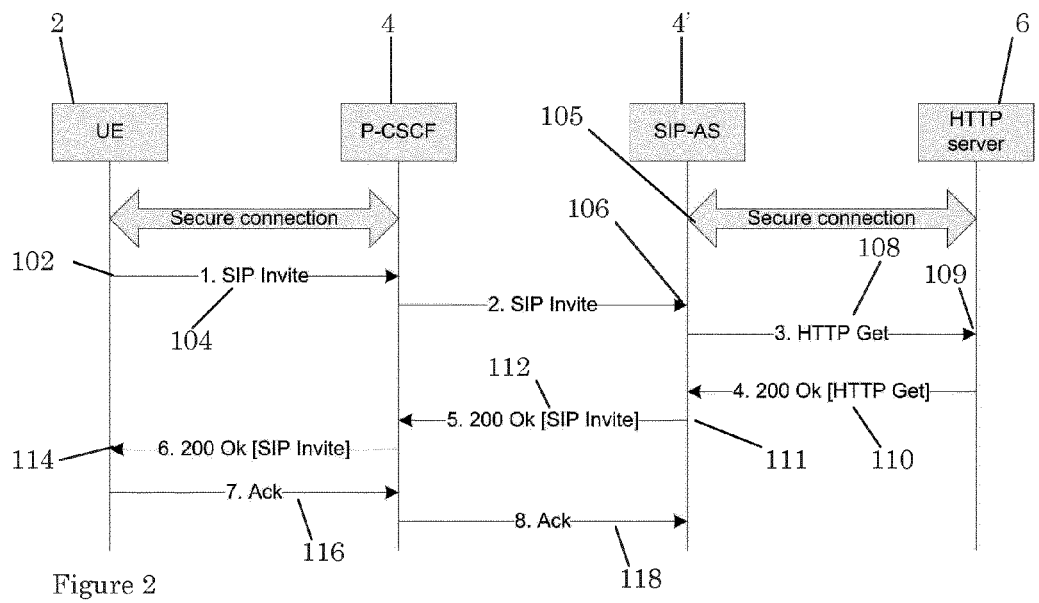
FIG. 2 shows an example of a signaling sequence according to the invention.

FIG. 2 shows an example of a signaling sequence according to the invention. In this example the UE 2 is registered in the IMS network. The UE 2 acts as Session Initiation Protocol (SIP) terminal. The UE 2 has a first secure connection with the IMS network established. This first secure connection in this example results from authentication of the UE 2 with the IMS network, e.g. upon registration. There is no Access Session Border Gateway (A-SBG) in between the UE 2 and the P-CSCF 4. Alternatively, the P-CSCF and A-SBG are integrated. In this example, a second secure connection exists between the SIP-AS and HTTP Server. This second secure connection in this example exists because of a trust relationship (e.g. a contractual commitment) between an operator of the IMS network and an operator of the HTTP server.

The UE 2 includes an HTTP client 31, e.g. an HTTP browser for browsing HTTP content, e.g. web pages on the internet. Step 1, The HTTP client 31 in the SIP terminal (UE) 2 prepares an HTTP Get request message towards a certain destination, i.e. the HTTP server 6. The HTTP Get message is encapsulated in the body of an Invite request message 104. The Invite request message is sent off to a SIP-AS 4' in the IMS network that the subscriber is registered with. The Invite request message is targeted towards the SIP-AS 4'. Hereto, the Request Uniform Resource Identifier (R-URI) of the Invite request message contains a designated service Uniform Resource Identifier (URI) related to this SIP-AS.

Step 2, details of routing this Invite request message to the SIP-AS are not shown in FIG. 2, since they are understood by the informed reader. The SIP-AS may receive the Invite request message via a Serving Call Session Control Function (S-CSCF) entity (Initial Filter Criteria (IFC) based service triggering). Alternatively, Public Service Identity (PSI) based service triggering may be applied. Other methods of routing the Invite to the SIP-AS are not excluded, e.g. direct routing from the P-CSCF to the SIP-AS.

Step 3, the SIP-AS receives the Invite request message (104) and determines from the R-URI that it shall act as User Agent Server (UAS) for this Invite request message. It retrieves 106 the HTTP Get message from the body of the Invite message. The SIP-AS may at this point send a 183 Session progress to the UE (not shown).

The SIP-AS determines 105 from the destination of this HTTP Get message (the R-URI in the HTTP Get message or the IP address resulting from Domain Name System (DNS) resolving on this R-URI) that the destination is an HTTP server with which a trust relationship exists.

The SIP-AS sends 108 the HTTP Get message to the HTTP server through the secure connection with that HTTP server.

Step 4, the HTTP server receives 109 the HTTP Get request. The HTTP Get request arrives over the secure connection with the SIP-AS with which the HTTP server has a trust relation. Hence, HTTP server will not apply authentication. HTTP Server sends 110 a 200 Ok final response to the SIP-AS.

Step 5, the SIP-AS packs 111 the 200 Ok related to the HTTP Get request into a 200 Ok related to the SIP Invite request, and sends this 200 Ok response to the P-CSCF 4.

Step 6, the P-CSCF 4 forwards 112 the 200 Ok response to the UE 2.

Step 7, the UE 2 retrieves 114 the 200 Ok related to the HTTP Get from the 200 Ok related to the SIP Invite. The UE forwards the 200 Ok related to the HTTP Get to the HTTP client. This 200 Ok related to the HTTP Get contains the requested web page. The HTTP browser displays the web page, e.g. on a screen of the UE 2.

The UE sends 116 an Ack message, as normal for successful termination of Invite transaction. Step 8, the P-CSCF 4 forwards 118 the Ack message to the SIP-AS 4'.

After message 118, the following condition exists. The SIP Invite transaction between the UE 2 and the SIP-AS 4' is terminated. The HTTP Get transaction between HTTP browser 31 and the HTTP server 6 is terminated. The requested content is transferred from the HTTP server 6 to the HTTP client 31 (in the UE 2) and is displayed to the user.

The SIP-AS 4' may augment the HTTP Get request message. It may, for example, add information to the message such as P-access-network-info, User-agent, From, etc.

The above-described example can be elaborated with one or more of the following options Optionally, the 200 Ok final response on the HTTP Get may include an HTTP page containing one ore more embedded Uniform Resource Locators (URLs), each requiring its own HTTP Get transaction. There will in that case be subsequent HTTP Get transactions initiated by the HTTP client 31 in the SIP UE 2. These subsequent HTTP Get transactions will also traverse the first secure connection (IMS tunnel) in the manner described above.

Optionally, when the SIP-AS 4' receives the SIP Invite request and has retrieved the HTTP Get request from it and has applied the verifications mentioned in step 3 above, it allocates a token. The SIP-AS 4' then sends a 200 OK related to the Invite request. This 200 Ok contains in the body part a final response related to the HTTP Get request. This final response related to the HTTP Get request contains the token and contains an instruction to redirect the HTTP Get to an alternative destination. This sending of further HTTP message via an alternative network applies to all further HTTP messages sent within the HTTP session that is established with the HTTP Get transaction. The token may e.g. be a URI parameter for the R-URI in the HTTP Get request. That alternative destination is the SIP-AS 4'. The HTTP browser 31 in the UE 2 sends the diverted HTTP Get request outside the IMS security association, towards this alternative destination, i.e. the SIP-AS 4'. The SIP-AS 4' determines from the token, present as R-URI parameter, that the HTTP Get may be forwarded to the HTTP server 6. The remaining HTTP message exchange now runs between the HTTP client 31 and the HTTP server 6, via the SIP-AS 4'. The SIP-AS 4' is, for the remainder of the HTTP signaling, acting as HTTP proxy.

Optionally, the capability of the IMS security association between the UE 2 and the IMS network can be enhanced. Besides supporting SIP signaling, it can support native HTTP signaling. Thereto, the IMS server 4, 4' can be provided with support unit 30 for supporting native HTTP signaling. The support unit is arranged for supporting communication between the IMS server 4, 4' and the HTTP server 6 using HTTP messages, not packed in SIP messages. Hence, the support unit 30 renders the IMS server able to transmit HTTP messages. The support unit 30 also renders the IMS server able to receive, and if required properly interpret, HTTP messages. The UE 2 may then send the HTTP Get request message towards the HTTP server and uses the P-CSCF 4 as HTTP proxy. The P-CSCF 4 then forwards the HTTP Get request to the HTTP Server 6. The P-CSCF 4 has a secure connection with the HTTP Server 6, in the same manner as the SIP-AS 4' may have a secure connection with the HTTP server 6.

This third proposed option allows for efficient HTTP message exchange between the HTTP client 31 in the SIP UE 2 and the HTTP server 6. It has the following characteristics: a secure IMS connection is used, no additional authentication is needed, and native HTTP signaling is used. Hence, there is no need to pack and unpack HTTP messages into SIP messages or from SIP messages.

The various options do not deviate from the principle that the IMS secure connection is used for HTTP access, removing the need for additional authentication of the UE with the HTTP server. The present invention allows for accessing HTTP servers through a secure SIP connection, without an application server being adapted and configured for that specific HTTP service, running on a specific HTTP server.

Figure 3:
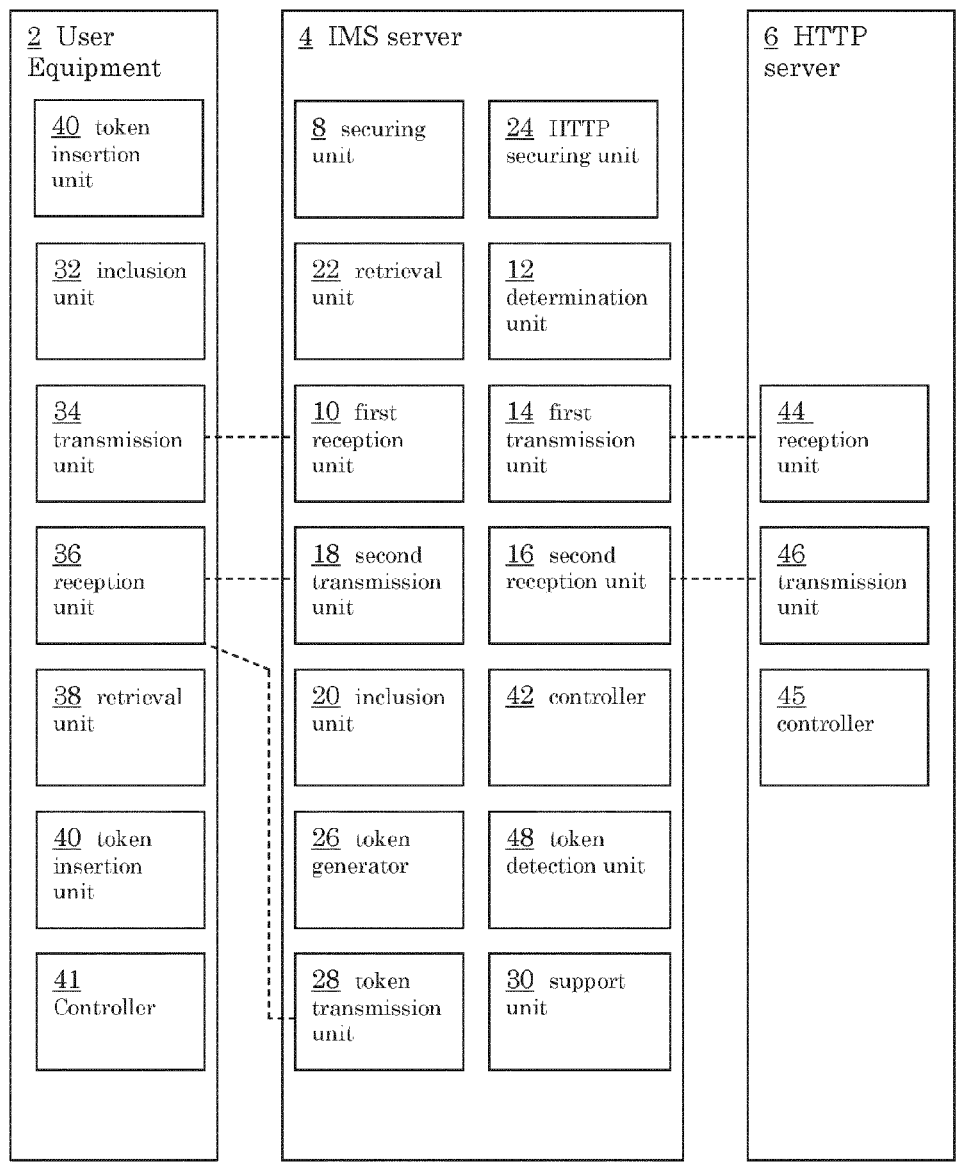
FIG. 3 shows a schematic representation of the system 1 as described with respect to FIG. 1 and FIG. 2.

FIG. 3 shows a schematic representation of the system 1 as described with respect to FIG. 1 and FIG. 2. The system comprises the UE 2, the IMS server 4 and the HTTP server 6.

The UE 2 in this example is a UE for use in a SIP-based communications network. The UE 2 comprises an inclusion unit 32 arranged for including the HTTP message, such as the HTTP Get request, in a SIP Invite request message. The UE 2 further comprises a transmission unit 34 arranged for transmitting the SIP Invite request message 104 to the IMS server 4. The UE 2 further includes a reception unit 36 arranged for receiving the SIP response message 112, such as the 200 Ok, including the HTTP response message from the IMS server 4. The UE further includes a retrieval unit 38 arranged for retrieving the HTTP response message 110 from the SIP response message. The UE 2 also includes a controller 41 communicatively connected to the inclusion unit 32, the transmission unit 34, the reception unit 36 and the retrieval unit 38 for controlling the inclusion unit 32, the transmission unit 34, the reception unit 36 and the retrieval unit 38.

The IMS server 4 in this example is an IMS server for a SIP-based communications network 1. The IMS server comprises a securing unit 8 arranged for establishing a secure connection with UE 2, e.g. by means of authentication of the UE with the IMS network, or by means of certification. It is noted that the securing unit 8 may be included in another entity than the IMS server 4. For example, when the IMS server is constituted by a SIP-AS 4' the securing unit would be included in the P-CSCF 4.

The IMS server can e.g. be the P-CSCF 4 or the SIP-AS 4'. The IMS server 4 comprises a first reception unit 10 arranged for receiving, from the UE 2 the HTTP message, included in the SIP Invite request message 104, destined for the HTTP server 6. The IMS server 4 further includes a retrieval unit 22 arranged for retrieving the HTTP message from the SIP Invite request message 104. The IMS server 4 further includes a determination unit 12 arranged for determining, on the basis of the HTTP message, whether or not a trust relation exists between the IMS server 4 and the HTTP server 6. This trust relationship can result from a contractual agreement of an operator of the IMS server with an operator of the HTTP server. The IMS server 4 further includes a first transmission unit 14 arranged for, if the trust relation exists, transmitting the HTTP message 108 to the HTTP server 6. The IMS server 4 further includes a second reception unit 16 arranged for receiving, from the HTTP server 6, the HTTP response message 110, such as the 200 Ok. The IMS server 4 further includes a second transmission unit 18 arranged for transmitting the HTTP response message 110 to the user equipment 2.

In the example of FIG. 3, the IMS server 4 further includes an inclusion unit 20 arranged for including the HTTP response message 110 in the SIP response message 112 prior to transmitting the HTTP response message to the UE 2. The second transmission unit 18 is then arranged for transmitting the SIP response message 112 including the HTTP response message 110 to the UE 2.

Optionally, the IMS server 4 further includes an HTTP securing unit 24 arranged for establishing a secure connection with the HTTP server.

The IMS server further includes a controller 42 communicatively connected to the securing unit 8, the first reception unit 10, the determination unit 12, the first transmission unit 14, the second reception unit 16, the second transmission unit 18, the inclusion unit 20, the retrieval unit 22, and the HTTP securing unit 24 for controlling the securing unit 8, the first reception unit 10, the determination unit 12, the first transmission unit 14, the second reception unit 16, the second transmission unit 18, the inclusion unit 20, the retrieval unit 22, and the HTTP securing unit 24.

The HTTP server 6 includes a reception unit 44 arranged for receiving the HTTP message 108 from the IMS server 4. The HTTP server further includes a transmission unit arranged for transmitting the HTTP response message 110 to the IMS server. The HTTP server 6 further includes a controller 45 communicatively connected to the reception unit 44 and the transmission unit 46 for controlling the reception unit 44 and the transmission unit 46.

As described above, optionally, when the IMS server 4 receives the SIP Invite request and has retrieved the HTTP Get request from it and has applied the verifications mentioned in step 3 above, it allocates a token. Thereto, the IMS server 4 includes a token generator 26 arranged for generating a token to be associated with an HTTP message, such as an HTTP Get request message, and a token transmission unit 28 for transmitting the token to the UE 2. The UE 2 includes a token insertion unit 40 arranged for inserting the token in the HTTP Get request sent by the UE 2 outside the IMS security association, towards the alternative destination, i.e. the IMS server 4. The IMS server 4 further includes a token detection unit 48 arranged for detecting whether or not a received HTTP (Get request) message has the token associated therewith. If no token is associated with the HTTP message, The IMS server 4 transmits the HTTP message to the HTTP server 6 using the first transmission unit 14, wherein the IMS server acts as SIP application server. If a token is associated with the HTTP message, the IMS server 4 transmits the HTTP message to the HTTP server 6 using the first transmission unit 14, wherein the IMS server acts as HTTP proxy.

The controller 42 can further be communicatively connected to the token generator 26, the token transmission unit, the support unit 30, and the token detection unit 48 for controlling the token generator 26, the token transmission unit, the support unit 30, and the token detection unit 48.

Secure access for other IP services than SIP may be applied for a variety of applications, including, but not limited to HTTP messaging for WeShare/Rich Communication Suite (RCS), and XCAP (XML/HTTP) messaging for user self-control within IMS/Multimedia Telephony (MM-Tel).

HTTP signaling may be signaled through the Proxy that is also used for SIP. More specifically, the P-CSCF in the IMS network may be enhanced to support native HTTP. HTTP messages (requests and responses) are transferred through the secure connection that is established between the UE 2 and the IMS network. This is depicted in FIG. 1.

Figure 4:
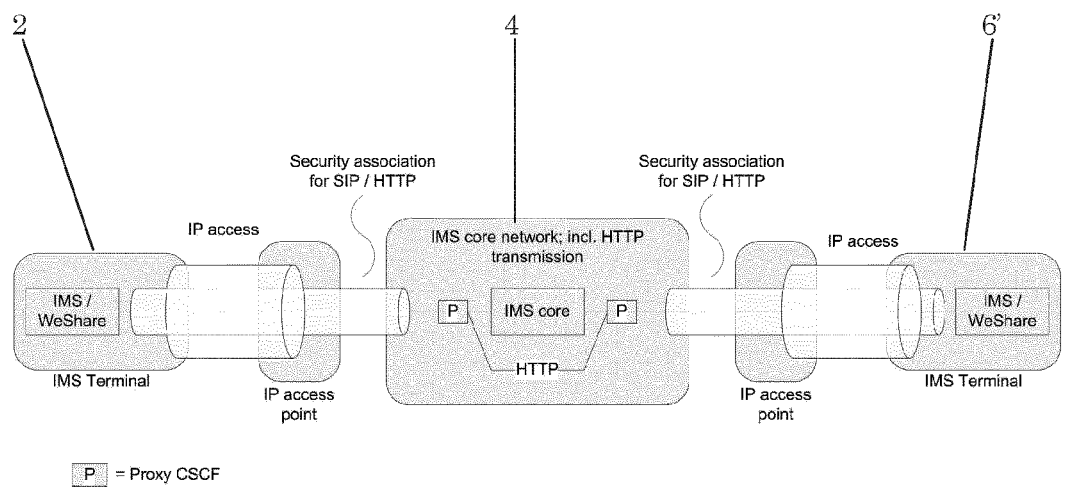
FIG. 4 is an embodiment of a system according to the invention.

FIG. 4 shows how the native HTTP support in the P-CSCF 4 may be applied for WeShare/RCS services.

The MMTel or WeShare/RCS application in the terminal 2 is configured to use the P-CSCF 4 as HTTP proxy, similar to the manner in which that same application uses the P-CSCF 4 as SIP proxy. In that way, the HTTP signaling runs via the secure IP access to/from the XDMS (for XCAP) and to/from a remote party terminal 6' (for WeShare/RCS application, HTTP). When the one WeShare terminal 2 wants to send an HTTP message to the peer WeShare terminal 6', it has to obtain that other terminal's contact address for HTTP messages. That other terminal 6', i.e. the peer, reports for that purpose its contact address associated with the secure tunnel between itself and the IMS core network. When HTTP messages are directed to that terminal 6', these messages will traverse the secure tunnel.

It will be appreciated that the securing unit 8, the first reception unit 10, the determination unit 12, the first transmission unit 14, the second reception unit 16, the second transmission unit 18, the inclusion unit 20, the retrieval unit 22, the HTTP securing unit 24, token generator 26, the token transmission unit 28, the support unit 30, the inclusion unit 32, the transmission unit 34, the reception unit 36, the retrieval unit 38, the token insertion unit 40, the controller 41, the controller 42, the reception unit 44, the controller 45 the transmission unit 46, and the token detection unit 48 can be embodied as dedicated electronic circuits, possibly including software code portions. The securing unit 8, the first reception unit 10, the determination unit 12, the first transmission unit 14, the second reception unit 16, the second transmission unit 18, the inclusion unit 20, the retrieval unit 22, the HTTP securing unit 24, token generator 26, the token transmission unit 28, the support unit 30, the inclusion unit 32, the transmission unit 34, the reception unit 36, the retrieval unit 38, the token insertion unit 40, the controller 41, the controller 42, the reception unit 44, the controller 45 the transmission unit 46, and the token detection unit 48 can also be embodied as software code portions executed on, and e.g. stored in, a memory of, a programmable apparatus such as a computer.

The invention provides an improved secure communication with the HTTP server without the need for additional authentication from the user. This has at least two advantages. First, there is no need for additional authentication by the user for HTTP access, and second HTTP access is more secure by the secure connection from IMS access, which is regarded as reliable.

In the foregoing specification, the invention has been described with reference to specific examples of embodiments of the invention. It will, however, be evident that various modifications and changes may be made therein without departing from the broader spirit and scope of the invention as set forth in the appended claims.

However, other modifications, variations, and alternatives are also possible. The specifications, drawings and examples are, accordingly, to be regarded in an illustrative sense rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A user equipment for use in a secure connection with an Internet Protocol Multimedia Subsystem (IMS) network, the user equipment comprising
    an inclusion unit arranged for including an HTTP message towards an HTTP server in a SIP Invite request message;
    a transmission unit arranged for transmitting the SIP Invite request message to an IMS server;
    a reception unit arranged for receiving a SIP response message including an HTTP response message from the IMS server;
    a retrieval unit arranged for retrieving the HTTP response message from the SIP response message;
    a controller communicatively connected to the inclusion unit, the transmission unit, the reception unit and the retrieval unit for controlling said units, and
    a token insertion unit arranged for associating a token, received from the IMS server, with further HTTP messages;
wherein the transmission unit is arranged for transmitting the further HTTP messages having the token associated therewith to the IMS server, outside an IMS security association between the user equipment and the IMS network.

2. A method, in a user equipment, for use in a secure connection with an Internet Protocol Multimedia Subsystem (IMS) network, the method comprising
    including an HTTP message towards an HTTP server in a SIP Invite request message;
    transmitting the SIP Invite request message to an IMS server;
    receiving a SIP response message that includes an HTTP response message from the IMS server;
    retrieving the HTTP response message from the SIP response message;
    associating a token, received from the IMS server, with further HTTP messages;
    and transmitting the further HTTP messages having the token associated therewith to the IMS server outside an IMS security association between the user equipment and the IMS network.

3. A user equipment for use in a secure connection with an Internet Protocol Multimedia Subsystem (IMS) network, the user equipment comprising:
- an inclusion circuit arranged for including an HTTP message towards an HTTP server in a SIP Invite request message;
- a transmission circuit arranged for transmitting the SIP Invite request message to an IMS server;
- a reception circuit arranged for receiving a SIP response message including an HTTP response message from the IMS server;
- a retrieval circuit arranged for retrieving the HTTP response message from the SIP response message;
- a controller communicatively connected to the inclusion circuit, the transmission circuit, the reception circuit and the retrieval circuit for controlling said circuits, and
- a token insertion circuit arranged for associating a token, received from the IMS server, with further HTTP messages, wherein the transmission circuit is arranged for transmitting the further HTTP messages having the token associated therewith to the IMS server outside an IMS security association between the user equipment and the IMS network.

4. The user equipment of claim 3, wherein one or more of the inclusion circuit, transmission circuit, reception circuit, retrieval circuit, controller, and token insertion circuit are implemented using a programmable circuit configured to execute program code stored in a memory associated with the programmable circuit.

\* \* \* \* \*